May 13, 1941. J. V. ZACCONE 2,241,755
SUCTION CONTROL FOR VEHICLE BODIES
Filed Jan. 10, 1939 2 Sheets-Sheet 2
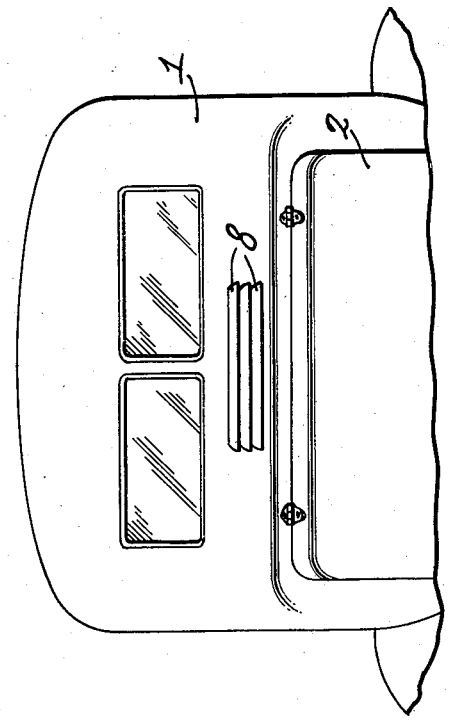
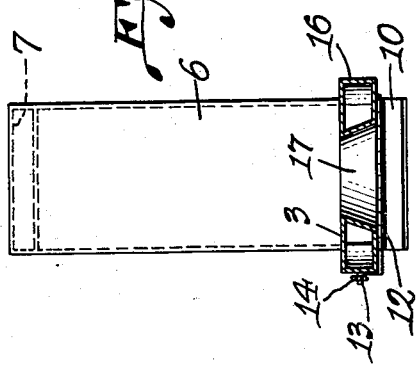
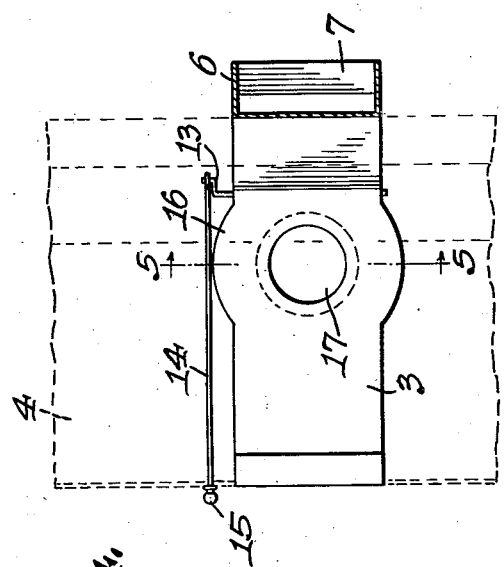
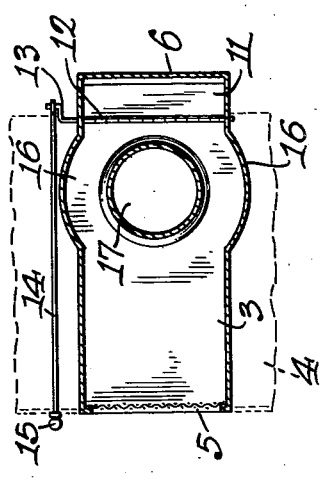
Joseph V. Zaccone
INVENTOR.
BY
ATTORNEYS.

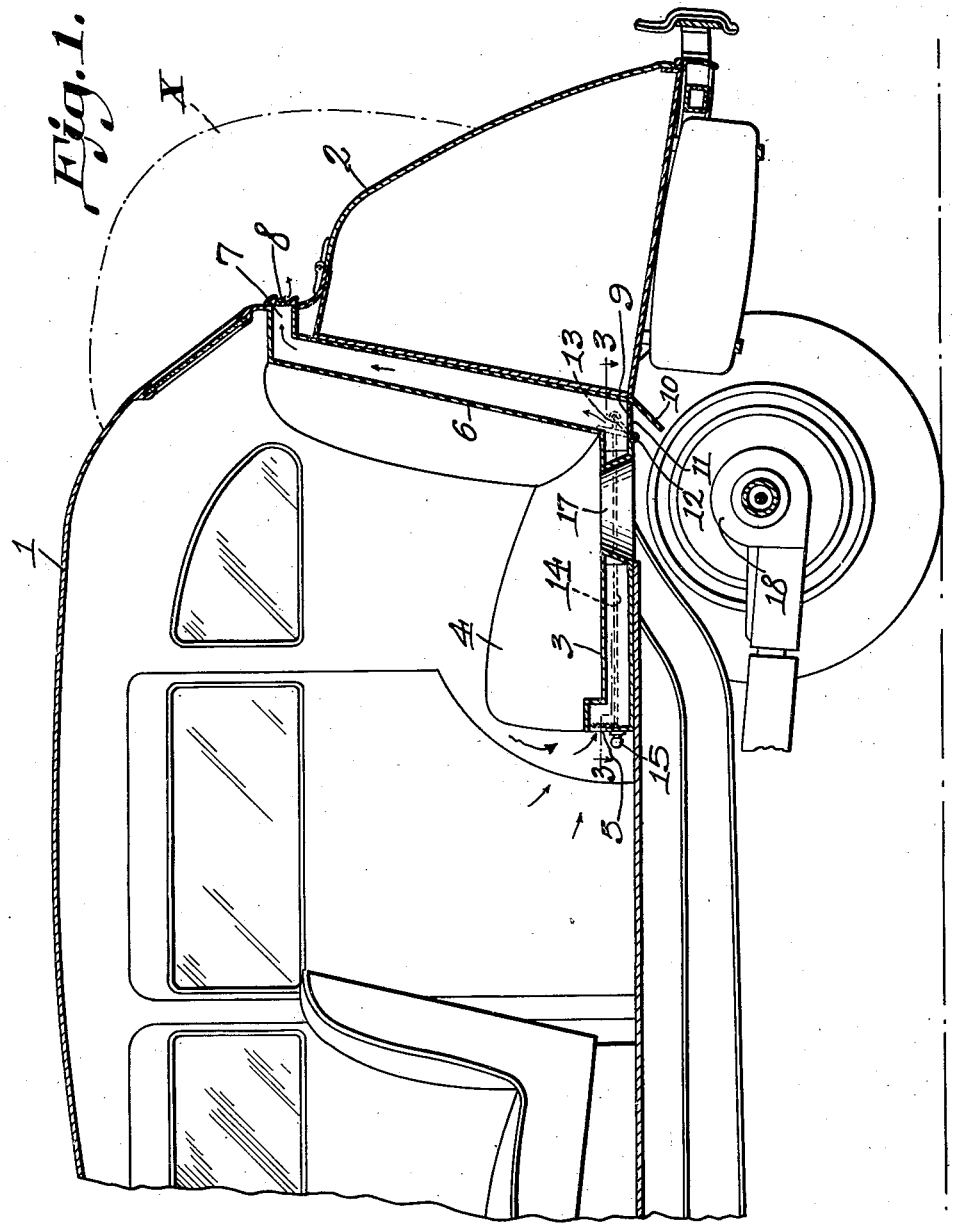

Patented May 13, 1941

2,241,755

UNITED STATES PATENT OFFICE 2,241,755

SUCTION CONTROL FOR VEHICLE BODIES

Joseph Vincent Zaccone, Chicago, Ill.

Application January 10, 1939, Serial No. 250,231

1 Claim. (Cl. 98—2)

This invention relates to vehicle bodies and more especially to a means whereby suction created by the forward movement of the body, can be controlled.

It is a fact well known to those experienced in automobile construction that when an automobile is travelling at high speed, a vacuum or rarefied area is created at the back of the body and tends to produce a drag upon the vehicle, thereby reducing the efficiency of the motor when maximum speeds are desired.

It is an object of the present invention to provide a means whereby the creation of this rarefied area is avoided by the inclusion of a ventilating flue extending forwardly relative to the car body and which can be utilized either for the purpose of withdrawing warm vitiated air from the interior of the body or for picking up air from beneath the body.

A further object is to provide a flue of this character having means whereby the circulation of air therethrough can be controlled by an occupant of the vehicle.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings—

Figure 1 is a vertical longitudinal section through the rear portion of an automobile equipped with the present improvements.

Figure 2 is a rear elevation of a portion of the body.

Figure 3 is an enlarged section through the flue taken on the line 3—3, Figure 1.

Figure 4 is a top plan view of the lower portion of the flue, adjacent portions of the vehicle body being indicated by broken lines.

Figure 5 is a section on line 5—5, Figure 4.

Referring to the figures by characters of reference 1 designates a portion of an automobile body which, in the present instance, is shown with a trunk 2. As has already been stated, when a vehicle body is moved forwardly, a partial vacuum or a rarefied area is produced directly back of the body as indicated, for example, at X in Figure 1. This partial vacuum has tended to create a drag upon the vehicle which has reduced the efficiency of the engine.

The present invention includes a means whereby air may be supplied to the area X so as to eliminate or greatly reduce the partial vacuum, thereby effecting a saving in fuel and permitting maximum speed to be obtained if desired.

The means employed for this purpose is also utilized for ventilating purposes. It includes a flue 3 preferably located under the back seat 4 of the vehicle and provided at its front end with an air inlet 5 which can be substantially flush with the front of the seat as shown. This flue is extended backwardly to an upwardly extending portion thereof indicated at 6 which is located back of the seat 4 and in front of trunk 2 and opens rearwardly to an outlet 7 in the back of the body close to but above the trunk. This outlet can be provided with slots or louvers 8 for the purpose of excluding moisture.

At the bottom of the upwardly extending portion 6 there is provided an air inlet 9 and depending from the back portion of this inlet is a downwardly and forwardly inclined deflector 10 projecting below the floor of the body. A damper 11 is hinged to the front wall of the opening 9 as indicated at 12 and has an arm 13 at one side thereof and outside of the flue which can be shifted by means of an operating rod 14 extending forwardly under the seat to a knob 15 or the like located where it can be reached readily by an occupant of the car.

Normally the damper 11 is in position as shown in Figure 1 at which time the opening 9 is closed. Thus as the vehicle moves forwardly, a suction is set up from within the vehicle body, air leaving the body adjacent to the floor and flowing through flue 3 and its extension 6 to the outlet 7 where it enters the rarefied area X and tends to reduce the drag which otherwise would be exerted upon the vehicle body during its forward movement. Should it be desired to eliminate the ventilating feature, all that would be necessary would be to shift the damper 11 from the position shown by full lines in Figure 1 to an upstanding position as indicated by broken lines in said figure. When the damper is in this upstanding position it closes communication between the lower portion of flue 3 and its upwardly projecting extension 6. It also uncovers the opening 9. Thus as the vehicle travels forwardly, air from beneath the body will be directed upwardly by the deflector 10 through opening 9 and into the upwardly extending portion 6 of the flue from which it will escape into the rarefied area X.

It is to be understood that the flue can be located wherever found most convenient and can be of any desired shape and size. In the structure illustrated it has been shown with an intermediate widened portion 16 containing an opening 17 at the center thereof which is out of communication with the interior of the flue but is so located as to provide ample clearance for the relative up and down movement of the vehicle body and the differential housing shown at 18. It is to be understood, however, that under some conditions this opening 16 is not required and in some cases the flue can be placed under the floor of the vehicle instead of on the floor. In every case, however, the flue is so located that, when desired, it can be utilized as a means for withdrawing air from the floor portion of the car and directing it into the rarefied area at the back of the body or can be used for directing outside air from under the body to said rarefied area.

What is claimed is:

The combination with a vehicle body proportioned to create a rarefied area at the back thereof, and a seat in the body, of means for supplying air from within the body to said area to simultaneously ventilate the body and increase pressure in said area, said means including a flue extending under the seat and upwardly back of the seat, said flue having an air inlet in one end opening into the body at the front of the seat, an air inlet opening through the bottom of the body, and an air outlet opening through the back of the body at the upper end of the flue and into said area.

JOSEPH VINCENT ZACCONE.